C. R. AUSTIN.
COASTER SLED.
APPLICATION FILED OCT. 31, 1918.
1,294,375.
Patented Feb. 18, 1919.
2 SHEETS—SHEET 1.
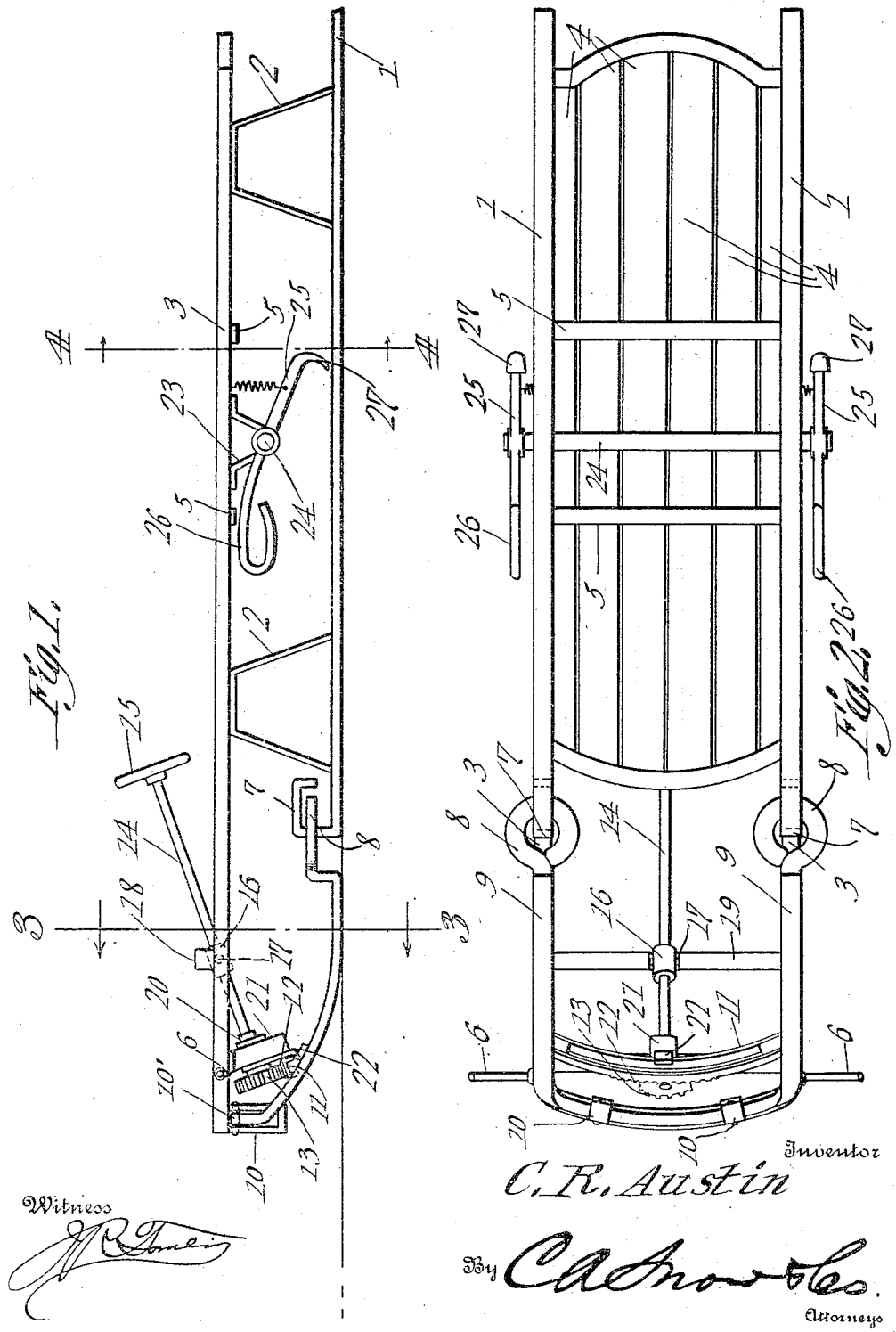
Inventor
C. R. Austin

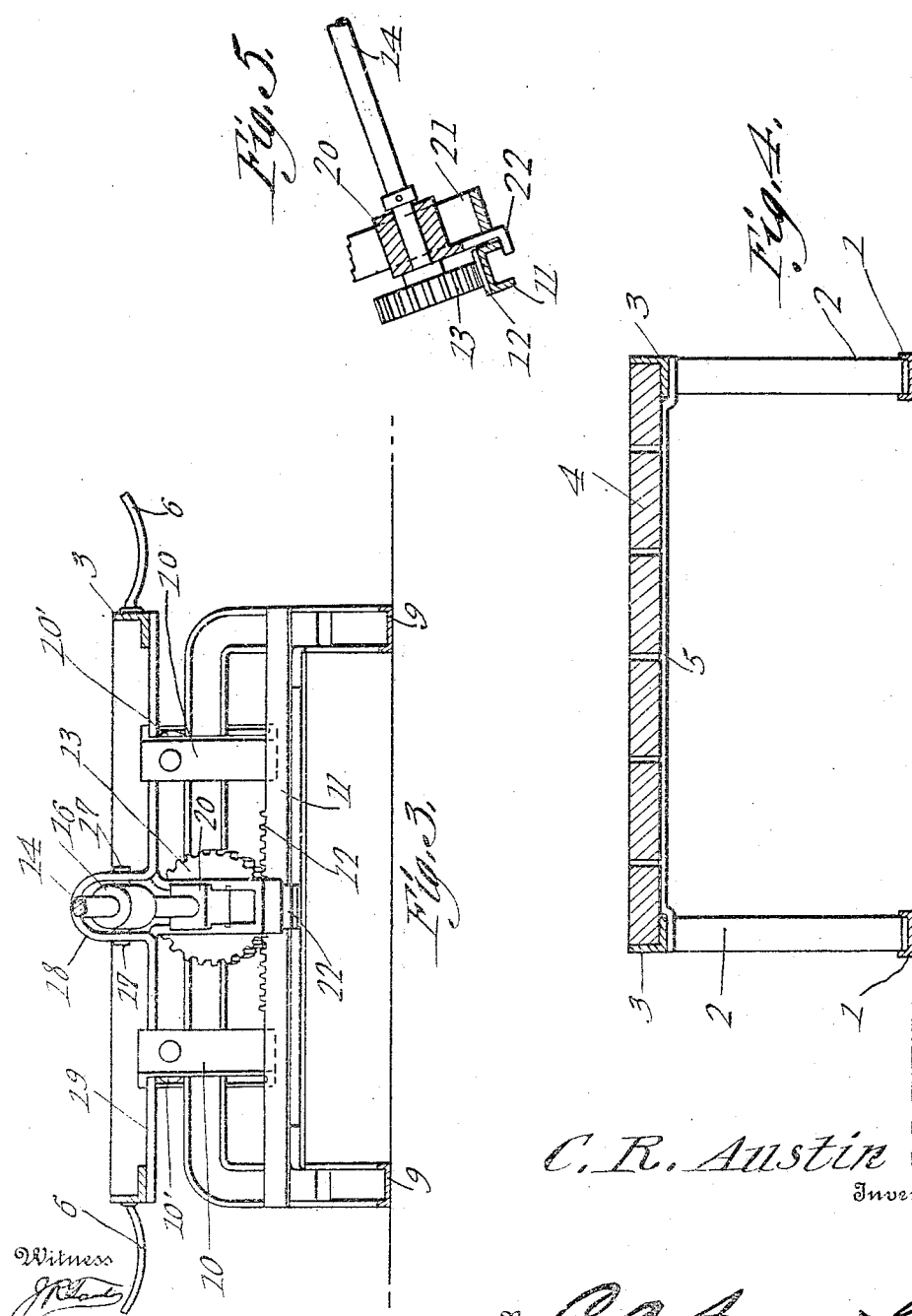

UNITED STATES PATENT OFFICE.

CHARLES R. AUSTIN, OF LAWRENCEBURG, KENTUCKY.

COASTER-SLED.

1,294,375.	Specification of Letters Patent.	Patented Feb. 18, 1919.

Application filed October 31, 1918. Serial No. 260,509.

*To all whom it may concern:*

Be it known that I, CHARLES R. AUSTIN, a citizen of the United States, residing at Lawrenceburg, in the county of Anderson and State of Kentucky, have invented a new and useful Coaster-Sled, of which the following is a specification.

The subject of this invention is a coaster sled intended primarily for individual use.

The main object of the invention is the provision of means for steering the sled.

Another object of the invention is the provision of means for connecting the steering or floating runners to the sled.

The invention also contemplates generally improving the construction and enhancing the utility of coaster sleds.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

A practical structure for carrying out the invention is illustrated in the accompanying drawings, wherein:—

Figure 1 is a view in side elevation of a sled constructed in accordance with the invention;

Fig. 2 is a bottom plan view of the same;

Fig. 3 is a cross section taken on the line 3—3 of Fig. 1;

Fig. 4 is a cross section taken on the line 4—4 of Fig. 1;

Fig. 5 is a fragmentary detail of the steering mechanism, shown partly in elevation and partly in section.

Referring to the drawings by numerals of reference:—

The sled consists of a pair of parallel runners 1, which may be formed of any suitable material, but are herein shown as constructed of channel bars. Upon the runners are secured the spaced knees 2, which rise from the runners and form supports for the frame 3 of the platform of the sled. The frame 3 is herein shown as formed of angle iron, though any suitable material may be employed for this purpose. The platform slats or boards 4 are secured in any suitable manner to the tie pieces 5, which are secured to and bridge the space between the sides of the frame 3. Foot rests 6 may be provided and consist of metallic rods, suitably curved, which are secured to the side bars of the frame 3 near the forward end thereof, and which extend laterally therefrom.

The forward ends of the runners 1 are bent to form upwardly projecting, angular hooks 7, which are adapted to enter, with a loose fit, the respective eyes 8 formed at the rear ends of the forward or floating runners 9.

The forward runners 9 may be formed of a single piece of suitable material bent into yoke shape, as shown, and the cross bar of the yoke is loosely mounted in links 10, which are secured to and depend from the front cross piece of the frame 3. Rollers 10' may be provided in the links 10 to contact the upper edge of the cross piece of the runners 9 and reduce friction between the parts when steering.

To permit lateral movement of the runners 9 for the purpose of steering the sled, a cross bar 11 is secured to and extends between the runners, and the upper surface of this bar is provided with teeth 12 to form a rack. A pinion 13 meshes with the teeth 12 of the rack and is rigidly affixed to the lower and forward end of a steering rod 14, which is inclined upwardly and rearwardly from the pinion, and has a steering wheel 15 rigidly secured to its upper and rearward end.

The steering rod 14 is journaled, at a position between its ends, in a journaling block 16, which rocks on trunnions 17, supported in a yoke or loop 18, struck upwardly from a cross piece 19, which cross piece is secured to the side bars of the frame 3 and extends between them near the forward end of the sled. The lower forward end of the steering rod 14 is journaled in a block 20, which slides in a bracket 21, which bracket depends from the frame, to which it is suitably secured adjacent the forward end thereof.

The block 20 is formed with an angular, depending finger 22, which engages under the rack bar 11 and insures movement of the block vertically in unison with the rack bar to retain the pinion 13 in engagement with the rack.

To provide means for reducing the speed of the sled, when desired, or for stopping the same, brackets 23 may be secured to and depend from the frame 3 and serve as hangers for a shaft 24, upon which are rigidly secured the brakes 25, formed with hand grips 26, and with hooked ends 27 adapted to engage the snow or ice and retard the travel of the sled.

It is thought that the operation of the device will be amply understood from the foregoing description without an extended and special explanation thereof.

Having described the invention, what is claimed as new is:—

1. A coaster sled, including runners, a platform supported on the runners and extending forwardly thereof, movable runners linked to the first mentioned runners, a rack bar secured to and extending transversely of the movable runners, a bracket secured to and depending from the forward end of the platform, a block slidable in the bracket, a steering rod journaled in the block, a connection between the block and the rack bar, and a pinion on the steering rod and meshing with the rack bar.

2. A coaster sled, including main runners, a platform supported on the runners, movable guide runners linked to the main runners, a steering rod, gearing between the steering rod and the guide runners, and means interposed between the steering rod and the guide runners whereby movement of the guide runners vertically will impart a like movement to the steering rod.

In testimony that I claim the foregoing as my own, I have hereto affixed my signature in the presence of two witnesses.

CHARLES R. AUSTIN.

Witnesses:
W. W. LANG,
J. D. HARP.

Copies of this patent may be obtained for five cents each, by addressing the "Commissioner of Patents, Washington, D. C."